US010355727B2

(12) United States Patent
Zhang et al.

(10) Patent No.: US 10,355,727 B2
(45) Date of Patent: Jul. 16, 2019

(54) INCREASING WIRELESS SPECTRAL EFFICIENCY BY LEVERAGING INTERFERING SIGNALS (71) Applicant: T-Mobile USA, Inc., Bellevue, WA (US)

(72) Inventors: Hongliang Zhang, Samammish, WA (US); Jeff Ahmet, Issaquah, WA (US); Dinesh Arcot Kumar, Sammamish, WA (US); Egil Gronstad, Encinitas, CA (US); Brian Allan Olsen, Bellevue, WA (US); Mark McDiarmid, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/849,502

(22) Filed: Dec. 20, 2017

(65) Prior Publication Data

US 2019/0007079 A1    Jan. 3, 2019

Related U.S. Application Data (60) Provisional application No. 62/527,846, filed on Jun. 30, 2017.

(51) Int. Cl.
*H04B 17/345* (2015.01)
*H04B 1/10* (2006.01)
(Continued)

(52) U.S. Cl.
CPC .......... *H04B 1/1027* (2013.01); *G06F 17/12* (2013.01); *H04B 17/345* (2015.01);
(Continued)

(58) Field of Classification Search
CPC .......... H04W 52/243; H04W 72/1226; H04W 16/18; H04W 16/32; H04W 28/18;
(Continued)

(56) References Cited

U.S. PATENT DOCUMENTS

| 8,000,655 B2 * | 8/2011 | Wang .................. H04B 1/7103 370/208 |
| 9,648,567 B2 | 5/2017 | Makhlouf et al. |
| 2008/0225979 A1 | 9/2008 | Prasad et al. |

FOREIGN PATENT DOCUMENTS

| EP | 2417820 | 2/2012 |
| WO | WO2015179518 | 11/2015 |

OTHER PUBLICATIONS

The PCT Search Report and Written Opinion dated Sep. 10, 2018 for the PCT Application No. PCT/US18/31820, 11 pages.

* cited by examiner

*Primary Examiner* — Rahel Guarino
(74) *Attorney, Agent, or Firm* — Lee & Hayes, P.C.

(57) ABSTRACT

A computing system may utilize interfering signals of two or more wireless devices for improving communications involving the two or more wireless devices. These techniques and architectures may allow for improved spectral efficiency that enables a relatively large number of wireless devices to communicate among one another via receivers that share overlapping or adjacent frequencies. Such utilization of interfering signals may help solve a general problem involving, for example, co-channel interference (CCI) arising from densely deployed relatively small wireless communication cells for increasing communication throughput.

20 Claims, 6 Drawing Sheets (51) Int. Cl.
*G06F 17/12* (2006.01)
*H04W 16/14* (2009.01)

(52) U.S. Cl.
CPC ............... *H04B 2001/1045* (2013.01); *H04B 2001/1072* (2013.01); *H04W 16/14* (2013.01)

(58) Field of Classification Search
CPC ......... H04W 36/0094; H04W 72/0406; H04W 72/042; H04W 84/045; H04W 88/02; H04W 88/04; H04W 88/06; H04W 88/08; H04W 52/244; H04B 17/318; H04B 7/024; H04B 17/27; H04B 7/0413; H04B 7/0452; H04L 1/0048; H04L 2025/03426; H04M 2207/18; H04M 1/72572; Y02D 70/1262; Y02D 70/1264; Y02D 70/1242
See application file for complete search history.

INCREASING WIRELESS SPECTRAL EFFICIENCY BY LEVERAGING INTERFERING SIGNALS

PRIORITY

The present application claims priority to U.S. Provisional Patent Application No. 62/527,846, filed on Jun. 30, 2017, entitled "Spectral Efficiency Mechanisms for C-RANs", the entirety of which is incorporated herein by reference.

BACKGROUND

In recent years, telecommunication devices have advanced from offering simple voice calling services within wireless communication networks to providing users with many new features. Telecommunication devices now provide messaging services such as email, text messaging, and instant messaging. Such devices may also provide data services such as Internet browsing, gaming, location services, and media services such as for streaming, storing and playing video, audio, and music, just to name a few examples. Thus, telecommunication devices, referred to herein as user devices, user equipment (UE) or mobile devices, are often used in multiple contexts. In addition to such features provided by telecommunication devices, the number of users of these devices have greatly increased. Such an increase in users is expected to continue.

With ever increasing telecommunication device usage, density of wireless communication networks tends to also increase. For example, to serve a greater number of wireless users, a greater number of cellular towers and small cells may be placed in a given area. Unfortunately, such increases may lead to an inflation of signal interferences among two or more mobile devices communicating with cell towers having overlapping coverage, for example.

Typical interference control solutions are to avoid or to reduce interference sources by re-using frequencies in a larger distance, adjusting antenna patterns, or using multiple antennas. Such solutions provide limited improvement in terms of spectrum efficiency, especially as more small cells or heterogeneous network (HetNets) cells are deployed in dense traffic areas.

Another issue associated with a typical wireless communication system is that a base station only processes its own received signals from devices within its serving area. Therefore, signals transmitted by other devices with the same or adjacent frequency are treated as interference at the base station. As the number of users increase, the corresponding interference level increases and the system becomes congested.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures that allow a computing system to utilize interfering signals of two or more wireless devices for improving communications involving the two or more wireless devices. For example, these techniques and architectures may allow for improved spectral efficiency that enables a relatively large number of wireless devices to communicate among one another via receivers that share overlapping or adjacent frequencies. Utilization of interfering signals may help solve a general problem involving, for example, co-channel interference (CCI) which often arises from densely deploying relatively small wireless communication cells (e.g., an area with dense traffic volume) for increasing communication throughput. Co-channel interference is crosstalk from two or more different radio transmitters that use overlapping or adjacent communication frequencies.

In cellular mobile communication, frequency spectrum is a precious resource which, to support more users, may include channels that are re-used (e.g., the same frequency channels are reassigned to other distant cells) by different cells to improve network capacity or data throughput. This may be the case particular for relatively small geographical areas. Co-channel interference may arise in cellular mobile networks because of such frequency reuse. As a result of co-channel interference, besides the intended signal from within a cell of a receiver, signals at the overlapping or adjacent frequencies (e.g., co-channel and adjacent channel signals) may arrive at the receiver from undesired transmitters located in other cells or overlapped areas and may lead to deterioration in receiver performance.

One example cause of co-channel interference is anomalous propagation resulting from adverse weather conditions, which can occasionally cause wireless signals to travel hundreds or thousands of kilometers further than usual. Another example cause of co-channel interference is an overly-crowded radio spectrum, which may occur in highly-populated areas.

Co-channel interference may be controlled by various radio resource management schemes. Generally, solutions have focused on intents to reduce or avoid such interference. A different approach is described by embodiments herein, which are directed to techniques and architectures to increase spectrum efficiency by constructively making use of co-channel interference, which is often unavoidable.

Recently, service providers have been introducing cloud-based or centralized radio access networks (C-RANs) within which a hub node/site includes a baseband unit (BBU). Such a hub node provides centralized or cloud based baseband processing functions.

C-RAN enables service providers to reduce operational cost by removing tower site space/power requirements, to joint-process signals from/to multiple cell sites to improve network performance, and to further enhance baseband processing power by using cloud-based computing (e.g., virtually "infinite" processing power). Such virtually infinite computing power and visibility of almost every cellular tower receiver enable service providers, wireless equipment vendors, and researchers, for example, to develop and deploy new algorithms, methods, or architectures for detecting signals transmitted by wireless devices by leveraging traditional 'interfering' signals to achieve an optimized spectrum efficiency. Thus, an 'interference-free' network may be possible.

Figure 1:
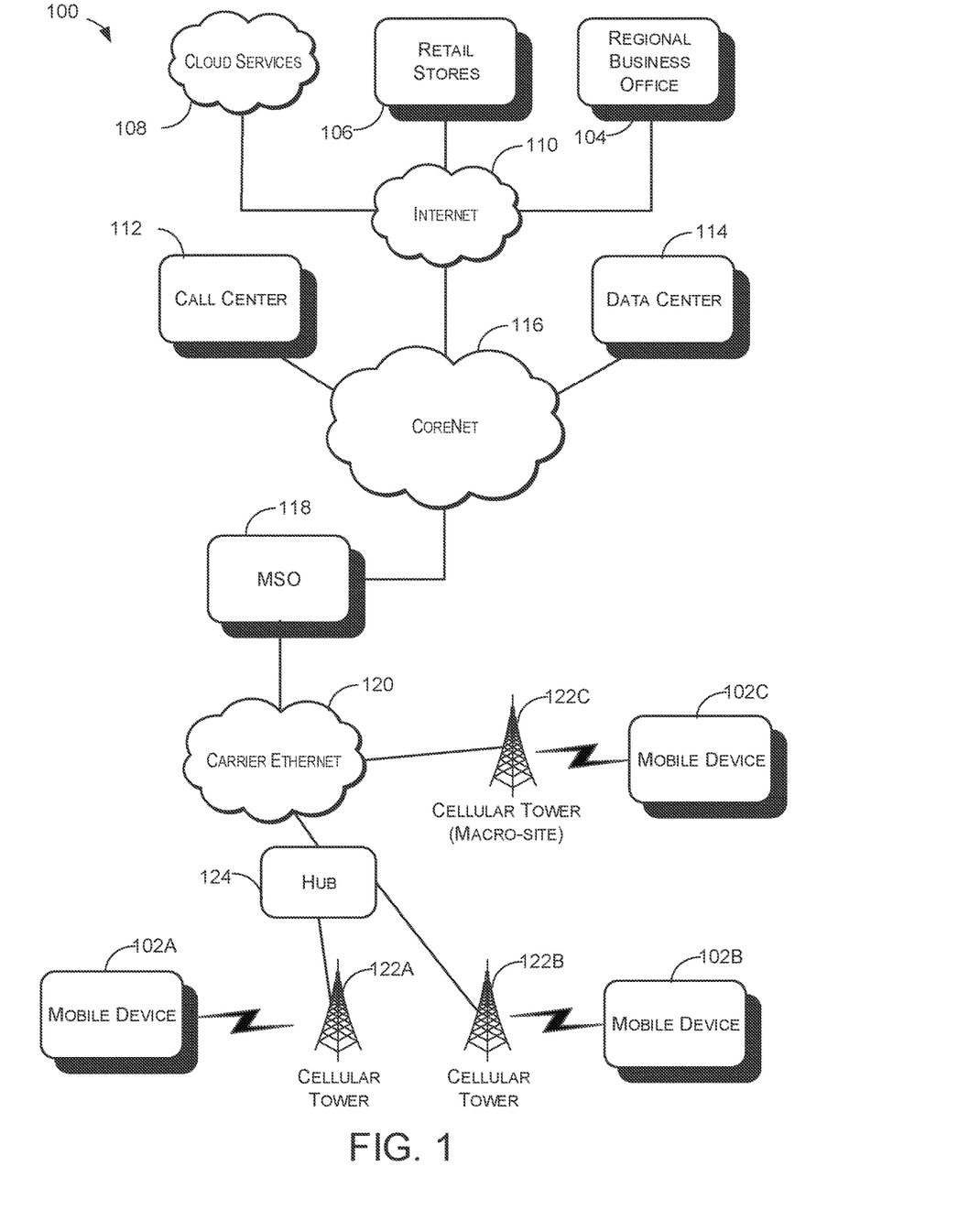
FIG. 1 schematically illustrates a wireless communication network, according to various embodiments.

FIG. 1 schematically illustrates an example of a wireless communication network 100 (also referred to herein as network 100) that may be accessed by mobile devices 102 (which need not necessarily be mobile and are also referred to herein as client devices). As can be seen, in various configurations, the wireless communication network 100 includes multiple nodes and networks. The multiple nodes and networks may include one or more of, for example, a regional business office 104, one or more retail stores 106, cloud services 108, the Internet 110, a call center 112, a data center 114, a corenet network 116, a mobile switch office (MSO) 118, and a carrier Ethernet 120.

Wireless communication network 100 may include other nodes and/or networks not specifically mentioned, or may include fewer nodes and/or networks than specifically mentioned. For example, wireless communication network 100 may include a hub node 124 as a BBU to support a group of cellular towers 122A and 122B that may include a radio remote header (RRH). Such a hub node may provide centralized or cloud-based baseband processing functions. A hub node and its serving cellular towers may be connected to one another by fiber, for example, to transport received/transmitted signals among them using different technologies such as a common protocol radio interface (CPRI) or Ethernet. This type of hub-spoke arrangement is considered as a Cloud or a centralized radio access network (C-RAN). C-RAN enables service providers to reduce operational cost by removing tower site space/power requirements, to joint-processing signals from/to multiple cell sites to improve network performance, and to further enhance baseband processing power by using cloud-based computing (e.g., virtually "infinite" processing power).

Access points such as, for example, cellular towers 122, can be utilized to provide access to wireless communication network 100 for mobile devices 102. Cellular tower 122C may be a traditional cellular tower site with a base station at its location and can be connected to the MSO via Carrier Ethernet as backhaul. Similarly, Cellular tower 122C provides access to wireless communication network 100 for mobile devices 102.

In various configurations, wireless communication network 100 may represent a regional or subnetwork of an overall larger wireless communication network. Thus, a larger wireless communication network may be made up of multiple networks similar to wireless communication network 100 and thus the nodes and networks illustrated in FIG. 1 may be replicated within the larger wireless communication network. In particular, in the example situation illustrated in FIG. 1, mobile device 102A is in a cell serviced by cellular tower 122A, mobile device 102B is in a cell serviced by cellular tower 122B, and mobile device 102C is in a cell serviced by cellular tower 122C which also may be a Macro-cell/Macro-site because it may transmit a high power level and hence may have a larger coverage area than small cells In various configurations, mobile devices 102 may comprise any devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, mobile devices 102 may range widely in terms of capabilities and features. For example, one of mobile devices 102 may have a numeric keypad, a capability to display only a few lines of text and be configured to interoperate with only GSM networks. However, another of mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (e.g., mobile devices that do not contain a functional subscriber identity module ("SIM")), roaming mobile devices (e.g., mobile devices operating outside of their home access networks), and/or mobile software applications.

In configurations, wireless communication network 100 may be configured as one of many types of networks and thus may communicate with mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In embodiments, as previously noted, the wireless communication network 100 may provide various services such as, for example, voice over long term evolution (VoLTE) service, video over long term evolution (ViLTE) service, rich communication services (RCS) and/or web real time communication (Web RTC).

Figure 2:
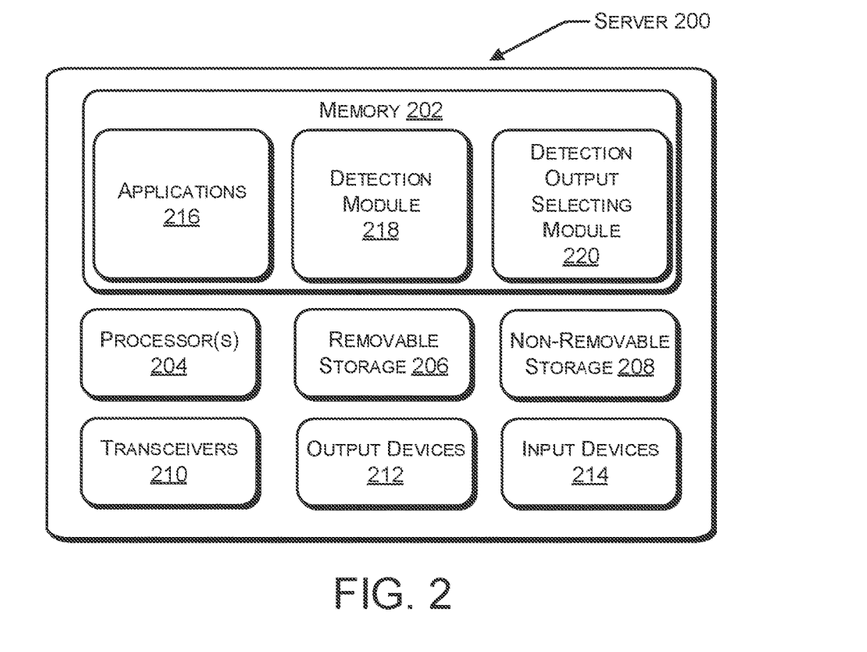
FIG. 2 illustrates a component level view of an example server configured for use in a wireless communication network.

FIG. 2 schematically illustrates a component level view of a server 200. Server 200 may be configured as a node for use within a wireless communication network such as 100, according to processes described herein. In some embodiments, server 200 may be a baseband unit (BBU). Server 200 includes a system memory 202, processor(s) 204, a removable storage 206, a non-removable storage 208, transceivers 210, output device(s) 212, and input device(s) 214.

In various implementations, system memory 202 is volatile (e.g., RAM), non-volatile (e.g., ROM, flash memory, etc.) or some combination of the two. In some implementations, processor(s) 204 is a central processing unit (CPU), a graphics processing unit (GPU), or both CPU and GPU, or any other sort of processing unit such as a digital signal processor (DSP). System memory 202 may also include applications 216 that allow the server to perform various functions. Among applications 216 or separately, memory 202 may also include a detection module 218 and a detection output selecting module 220, which are described in detail below.

In some embodiments, server 200 may be a computing system configured to utilize interfering signals of two or more wireless devices for improving communications involving the two or more wireless devices. Accordingly, applications 216 may include code that, upon execution, allows server 200 to detect signals transmitted by the two or more wireless devices (e.g., 102) of wireless communication network 100.

Server 200 may also include additional data storage devices (removable and/or non-removable) such as, for example, magnetic disks, optical disks, or tape. Such additional storage is represented in FIG. 2 by removable storage 206 and non-removable storage 208.

Non-transitory computer-readable media may include volatile and nonvolatile, removable and non-removable tangible, physical media implemented in technology for storage of information, such as computer readable instructions, data structures, program modules, or other data. System memory 202, removable storage 206 and non-removable storage 208 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by server 200. Any such non-transitory computer-readable media may be part of server 200.

In some implementations, transceivers 210 include any sort of transceivers known in the art. For example, transceivers 210 may include wired communication components, such as an Ethernet port, for communicating with other networked devices. Also or instead, transceivers 210 may include wireless modem(s) to may facilitate wireless connectivity with other computing devices via wi-fi/blue-tooth, infra-red. Further, transceivers 210 may include a radio transceiver that performs the function of transmitting and receiving radio frequency signals via an antenna such as microwave system transceivers operating over various frequency bands (e.g. 6 GHz, 11 GHz, 23 GHz, 28 GHz, 38 GHz, etc.), including 5G millimeter (MM) waves. Transceivers 210 may include a light transceiver that performs the function of transmitting and receiving light signal over fiber.

In some implementations, output devices 212 include any sort of output devices known in the art, such as a display (e.g., a liquid crystal display), speakers, a vibrating mechanism, or a tactile feedback mechanism. Output devices 212 also include ports for one or more peripheral devices, such as headphones, peripheral speakers, or a peripheral display.

In various implementations, input devices 214 include any sort of input devices known in the art. For example, input devices 214 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 3:
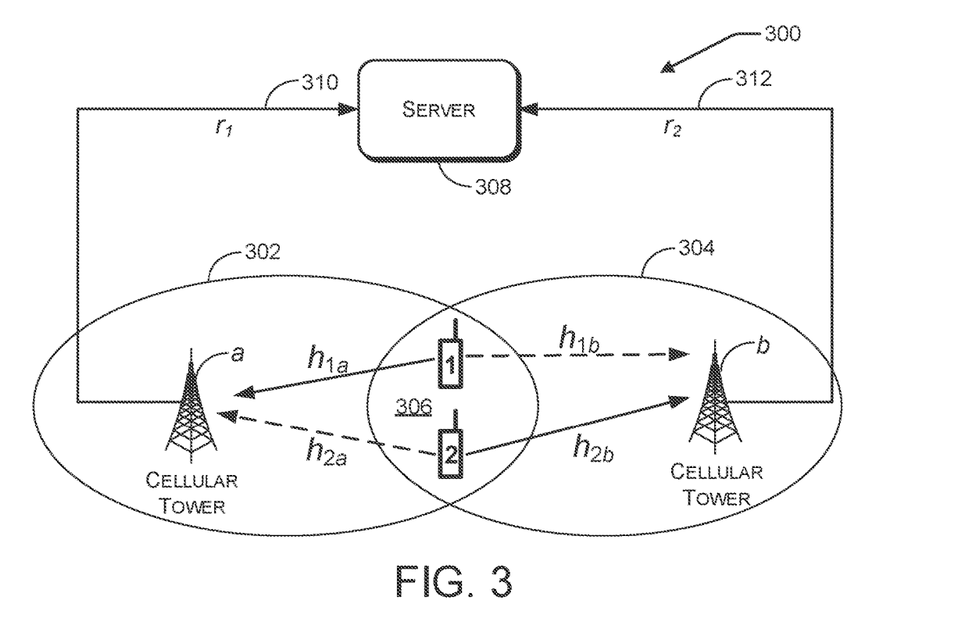
FIG. 3 schematically illustrates received signals in a wireless communication network, according to various embodiments.

FIG. 3 schematically illustrates received signals in a wireless communication network 300 with a C-RAN topology, according to various embodiments. In particular, network 300, which may be a subset of wireless communication network 100, includes a cellular tower a that establishes a cell 302 and a cellular tower b that establishes a cell 304 and a BBU server 308 to perform various baseband processing functions for cellular tower a and cellular tower b. A region 306 is an overlap of cellular coverage by both cellular tower a and cellular tower b. In the example, wireless devices 1 and 2 are located within overlap area 306. Cellular tower a receives a principle (or desired) signal transmitted from wireless device 1 with the channel gain of $h_{1a}$ and an "interfering" signal transmitted from wireless device 2 with the channel gain of $h_{2a}$. Herein, the term "principle signal" refers to a signal that is relatively the strongest among two or more signals. For example, a principle signal transmitted from wireless device 1 has a relatively larger received power level compared with the received power level of interfering a signal transmitted from wireless device 2 at cellular tower a. Cellular tower b receives a principle signal transmitted from wireless device 2 with the channel gain of $h_{2b}$ and an "interfering" signal transmitted from wireless device 1 with the channel gain of $h_{1b}$. In some examples, wireless device 1 and wireless device 2 may each have a line of sight to both cellular tower a and cellular tower b. In some examples, the frequency at which cellular tower a and cellular tower b receive signals generated by devices 1 and 2 may be the same.

Network 300 includes a server 308, such as a BBU, which may be similar to or the same as server 200, that takes the received signal $r_1$ transported over link (e.g., fronthaul) 310 from cellular tower a and the received signal $r_2$ transported over link (e.g., fronthaul) 312 from cellular tower b to perform baseband processing functions to either jointly or individually detect information bearing modulation symbols that were transmitted by wireless device 1 and wireless device 2 and then de-map the symbols to a coded bit sequence for decoding, respectively.

Server 308 may be tasked to derive channel gains $h_{1a}$, $h_{2a}$, $h_{1b}$, and $h_{2b}$ by using available network resources (e.g., time, frequency, and code) designed for sounding channel gains. For example, in an LTE network, there are reference pilot tones designed for estimating channel gains and other channel state information.

In an example embodiment, server 308 may group together wireless devices 1 and 2 that are in overlap area 306 where both cellular tower a and cellular tower b can receive signals transmitted from wireless device 1 and device 2. Generally, there may be more than two wireless devices in an overlap area (or both cellular towers can sense or detect the power from those wireless devices). In such a situation, server 308 may determine which among multiple wireless devices to group together based, at least in part, on received signal strengths respectively associated with the wireless devices. For example, referring to FIG. 3, wireless devices in addition to 1 and 2 may be located within cells 302 and 304. Server 308 may determine whether to group these devices with 1 and 2 or with other groups of devices based, at least in part, on respective signal strength of these devices. Such groupings may be used to establish a device set for performing a specific detection method such as multi-user multi-site multiple-input and multiple-output (MIMO) which detect what information bearing modulation constellation symbols were transmitted from wireless device 1 and wireless device 2. Such a grouping may also be used by BBU server 308 to derive channel gains $h_{1a}$, $h_{2a}$, $h_{1b}$, and $h_{2b}$ or more by scheduling a wireless device among the group to transmit its reference signal at a designed frequency or/and with a specific code so that the BBU can distinguishingly/exclusively compute a single channel/path gain.

Server 308 may have the first received signal $r_1$ from cellular tower a, as follows:

$$r_1 = h_{1a} \cdot S_1 + h_{2a} \cdot S_2 + n_1, \qquad \text{Equation 1}$$

where $n_1$ represents noise plus any insignificant interference signals received via cellular tower a from any of a number of other sources, such as from additional wireless devices. $S_1$ represents the information-bearing modulation constellation symbol transmitted by device 1. For example, $S_1$ can be a quadrature amplitude modulation (QAM) symbol such as 1+j if the 4-QAM modulation is employed at device 1. Other modulations such 64-QAM or 256-QAM can be used by wireless devices as well. Similarly, $S_2$ represents the information-bearing modulation constellation symbol transmitted by device 2.

Server 308 may have the second received signal $r_2$ from cellular tower b, as follows:

$$r_2 = h_{1b} \cdot S_1 + h_{2b} \cdot S_2 + n_2, \qquad \text{Equation 2}$$

where $n_2$ represents noise plus any insignificant interference signals received via cellular tower b from any of a number of other sources, such as from additional wireless devices.

Server 308 may have derived channel gains $h_{1a}$, $h_{2a}$, $h_{1b}$, and $h_{2b}$ before detecting $S_1$ and $S_2$. Therefore, these channel gains are considered as known inputs for any detection method. With the first received signal $r_1$, the second received signal $r_2$, and channel gains $h_{1a}$, $h_{2a}$, $h_{1b}$, and $h_{2b}$, server 308 is able to perform baseband processing functions and then to detect the signal $S_1$ transmitted by wireless device 1 and the signal $S_2$ transmitted by wireless device 2 with various detection algorithms or methods and then to demap the detected symbols into bit sequences for the decoder to complete data transmission from wireless device to network.

In an example embodiment, server 308 may directly detect the signal $S_1$ transmitted by wireless device 1 only based on the first received signal $r_1$ and channel gains $h_{1a}$ by ignoring the second received signal $r_2$. Similarly, server 308 may directly detect the signal $S_2$ transmitted by wireless device 2 only based on the second received signal $r_2$ and channel gains $h_{2b}$ by ignoring the first received signal $r_1$. This example embodiment is the same as the traditional implementation where the base station with a BBU is located at the cellular tower site. In this case, the first item in the received signal $r_1$ of Equation 1 is the desired or principle signal and the second item of Equation 1 is the interfering signal from device 2, which may degrade $S_1$ detection accuracy to some degree, depending on its level relative to the first item. Similarly, the second item in the received signal $r_2$ of Equation 2 is the desired or principle signal and the first item of Equation 2 is the interfering signal from device 1, which may degrade $S_2$ detection accuracy to some degree, depending on its level relative to the first item. In a traditional implementation, the main goal is to reduce interfering sources by re-using frequencies in certain areas or using various antenna beam patterns to avoid or attenuate interfering signals, instead of constructively using interference as described herein, for example.

In another example embodiment, with the Cloud or a centralized radio access network (C-RAN) architecture, server 308 may jointly process the first received signal $r_1$ from cellular tower a and the second received signal $r_2$ from cellular tower b with the known channel gains $h_{1a}$, $h_{2a}$, $h_{1b}$, and $h_{2b}$. For explanation, Equations 1 and 2 may be combined into matrix form:

$$\begin{bmatrix} r1 \\ r2 \end{bmatrix} = \begin{bmatrix} h1a & h2a \\ h1b & h2b \end{bmatrix} \begin{bmatrix} S1 \\ S2 \end{bmatrix} + \begin{bmatrix} n1 \\ n2 \end{bmatrix} \qquad \text{Equation 3}$$

(Characters written as subscripts in equations 1 and 2 are not written as such in the matrices of equation 3 for convenience.)

Equation 3 may also be written as $$R = H \cdot S + N \qquad \text{Equation 4}$$

Solving for S in equation 4 and absorbing the additional noise term N:

$$\hat{S} = \hat{H}^{-1} \cdot R = \hat{H}^{-1} \cdot H \cdot S + \hat{H}^{-1} \cdot N, \qquad \text{Equation 5}$$

where $\hat{S}$ approximately represents S including additional noise terms based on $n_1$ and $n_2$.

Server 308 may simultaneously solve the linear equations (e.g., equations 1 and 2) to get estimate $\hat{S}_1$ of the signal $S_1$ transmitted by wireless device 1 and the estimate $\hat{S}_2$ of signal $S_2$ transmitted by wireless device 2. Such results may be written as:

$$\hat{S}_1 = S_1 + \alpha \cdot (n_1) \qquad \text{Equation 6}$$

$$\hat{S}_2 = S_2 + \alpha \cdot (n_2), \qquad \text{Equation 7}$$

where $\alpha$ represents a proportional scaled version of a noise item.

In an example implementation, the estimate $\hat{S}_1$, in Equation 6, of the signal $S_1$ transmitted by wireless device 1 and the estimate $\hat{S}_2$, in Equation 7, of signal $S_2$ transmitted by wireless device 2 may be fed to de-mapper function blocks that detect which true symbols were transmitted by device 1 and device 2 and then de-map the detected symbols into a corresponding bit sequence to the forward error correction (FEC) decoders. The details on de-mapper and FEC decoder functions are described below. The above computing processing can be written as an algorithm program stored in application library in 216 and detection module 218 of server 200, for example.

In some embodiments, processes described herein performed by server 308 (or other processing entity) may be enabled by relatively strong processing power available to Cloud or C-RAN.

Figure 4:
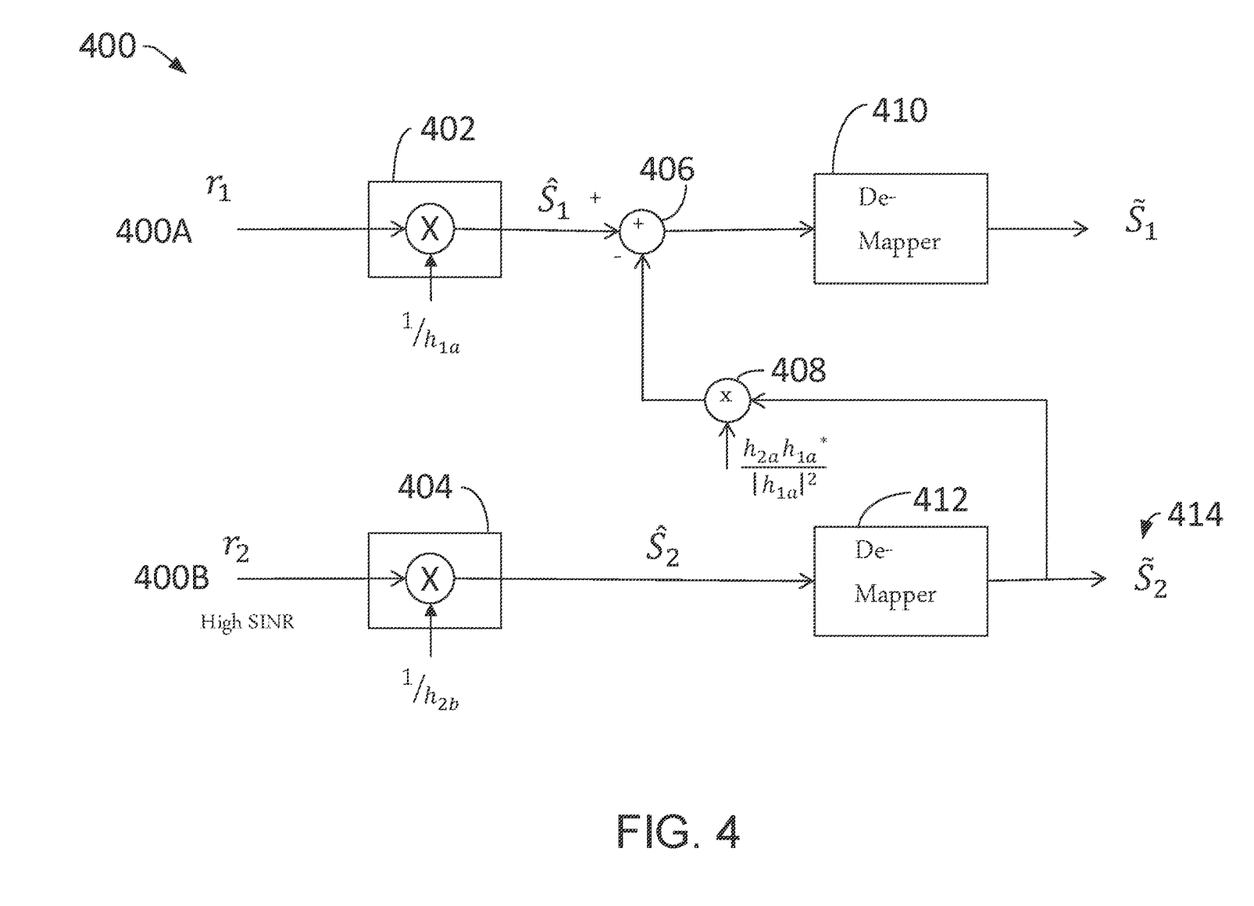
FIG. 4 is a block diagram of a process for detecting principle signals with assistance of decision feedback in a wireless communication network.

In another embodiment, server 308 performs a decision feedback assisting detection method that involves using a detected signal based on the received signal from one of wired or wireless paths 310 and 312 to offset (and thus reduce) an interference component of another one of wired or wireless paths 310 and 312. For example, referring further to FIG. 3, the detected principle component of $r_2$ on path 312 may be used to offset the interference component of $r_1$ on path 310. FIG. 4 is a block diagram of a process 400 for such a decision feedback assisting detection method.

In a particular example implementation using process 400 illustrated in FIG. 4, input 400A is a first received signal $r_1$ transported over link (e.g., fronthaul) 310 from cellular tower a. This signal may be written as $r_1 = h_{1a} \cdot S_1 + h_{2a} \cdot S_2 + n_1$, introduced above as Equation 1. Input 400B is a second received signal $r_2$ transported over link (e.g., fronthaul) 312 from cellular tower b. This signal may be written as $r_2 = h_{1b} \cdot S_1 + h_{2b} \cdot S_2 + n_2$, introduced above as Equation 2. As explained above, in the first received signal $r_1$, $h_{1a} \cdot S_1$ is the principle signal from wireless device 1 and $h_{2a} \cdot S_2$ is the interfering signal from wireless device 2. In the second received signal $r_2$, $h_{2b} \cdot S_2$ is the principle signal from wireless device 2 and $h_{1b} \cdot S_1$ is the interfering signal from wireless device 1.

Server 308 (or other processor) may determine the signal to interference plus noise power ratio (SINR) for each of $r_1$ and $r_2$. For example, SINR for $r_1$ may be based, at least in part, on $h_{1a}$ and $h_{2a}$ and SINR for $r_2$ may be based, at least in part, on $h_{1b}$ and $h_{2b}$. In the particular example, $r_2$ at input 404 has a larger SINR than that of $r_1$. This means that the principle signal $h_{2b} \cdot S_2$ from wireless device 2 is stronger relative to the interference signal $h_{1b} \cdot S_1$ as compared to the principle signal $h_{1a} \cdot S_1$ from wireless device 1 relative to the interference signal $h_{2a} \cdot S_2$. Thus, detected symbol, $\tilde{S}_2$, of the second received signal is a better choice for use as feedback to offset the interference signal of the first received signal as compared to using detected symbol, $\tilde{S}_1$, of the first channel component as feedback to offset the interference signal of the second channel component.

The second received signal $r_2$ may first be normalized with channel gain: $h_{2b}$, as in the first function block 404 of FIG. 4, so that the normalized received signal has the same scale as the signal $S_2$ transmitted by device 2. Thus the normalized $r_2$ is the estimate, $\hat{S}_2$, of $S_2$ and is as follows:

$$\hat{S}_2 = \frac{r_2}{h_{2b}} = S_2 + \frac{h_{1b} h_{2b}^*}{|h_{2b}|^2} S_1 + \frac{h_{2b}^*}{|h_{2b}|^2} n_2, \qquad \text{Equation 8}$$

where ( )* is the complex conjugate operation. Given a higher SINR for the second received signal $r_2$, $h_{2b}$ may have a much larger amplitude than $h_{1b}$. Therefore, interference (the $2^{nd}$ item) and noise level (the $3^{rd}$ item) power level in the above equation is much less than the power level of signal $S_2$. As a result, $S_2$ may be detected correctly with a high probability.

The estimate, $\hat{S}_2$, of $S_2$ may be fed to the de-mapper 412 which first identifies the closest modulation constellation symbol in terms of distance to $\hat{S}_2$. As a result, the identified modulation constellation symbol is considered to be the detected symbol, $\tilde{S}_2$ of $S_2$. With the adequate SINR, $\tilde{S}_2 = S_2$ with a high probability. Next, the de-mapper converts the detected modulation symbol into corresponding bits based on pre-set mapping rules. The most used modulation is a quadrature amplitude modulation (QAM) with different orders such as 4-QAM, 16-QAM, 64-QAM, or 256-QAM, for example. In this case, the de-mapper is called a QAM slicer.

Similarly, the first received signal $r_1$ may first be normalized with channel gain $h_{1a}$, as in function block 402, so that the normalized received signal has the same scale as the signal $S_1$ transmitted by device 1. Thus the normalized $r_1$ is the estimate $\hat{S}_1$ of $S_1$ and is as follows:

$$\hat{S}_1 = \frac{r_1}{h_{1a}} = S_1 + \frac{h_{2a} h_{1a}^*}{|h_{1a}|^2} S_2 + \frac{h_{1a}^*}{|h_{1a}|^2} n_1 \qquad \text{Equation 9}$$

In this decision feedback assisting detection implementation, the detected symbol, $\tilde{S}_2$ is treated as real $S_2$ transmitted by device 2 and may be fed to the first received signal detection at 406 to offset/remove the interference signal of $\hat{S}_1$ in Equation 9. $\tilde{S}_2$ is scaled in function block 408 with the coefficient of $$\frac{h_{2a} h_{1a}^*}{|h_{1a}|^2}$$

before it is fed to $\hat{S}_1$ at 406 for removing the interfering item ($2^{nd}$ item) in Equation 9. This results in the estimate, $\hat{S}_1$, as follows:

$$\hat{S}_1 = S_1 + \frac{h_{2a} h_{1a}^*}{|h_{1a}|^2}(S_2 - \tilde{S}_2) + \frac{h_{1a}^*}{|h_{1a}|^2} n_1 \qquad \text{Equation 10}$$

$$\hat{S}_1 = S_1 + \frac{h_{1a}^*}{|h_{1a}|^2} n_1 \text{ if } \tilde{S}_2 = S_2 \qquad \text{Equation 11}$$

Therefore, interfering signal from device 2 is removed from the estimate $\hat{S}_1$ in Equation 9. As a result, the detected symbol, $\tilde{S}_1$ of signal $S_1$ transmitted by device 1 is equal to $S_1$ with a high probability. Though occasionally there may be detection errors in $\tilde{S}_2$, depending on the SINR level of the received signal, $r_2$, the overall performance may still be good. Then the estimate $\hat{S}_1$ of $S_1$ is fed to de-mapper 410 which first identifies the closest modulation constellation symbol in terms of distance to $\hat{S}_1$. As the result, the identified modulation constellation symbol is considered as the detected symbol $\tilde{S}_1$ of $S_1$. With less interference or adequate SINR, $\tilde{S}_1 = S_1$ with a high probability. Then the de-mapper converts the detected modulation symbol into corresponding bits based on pre-set mapping rules.

Figure 5:
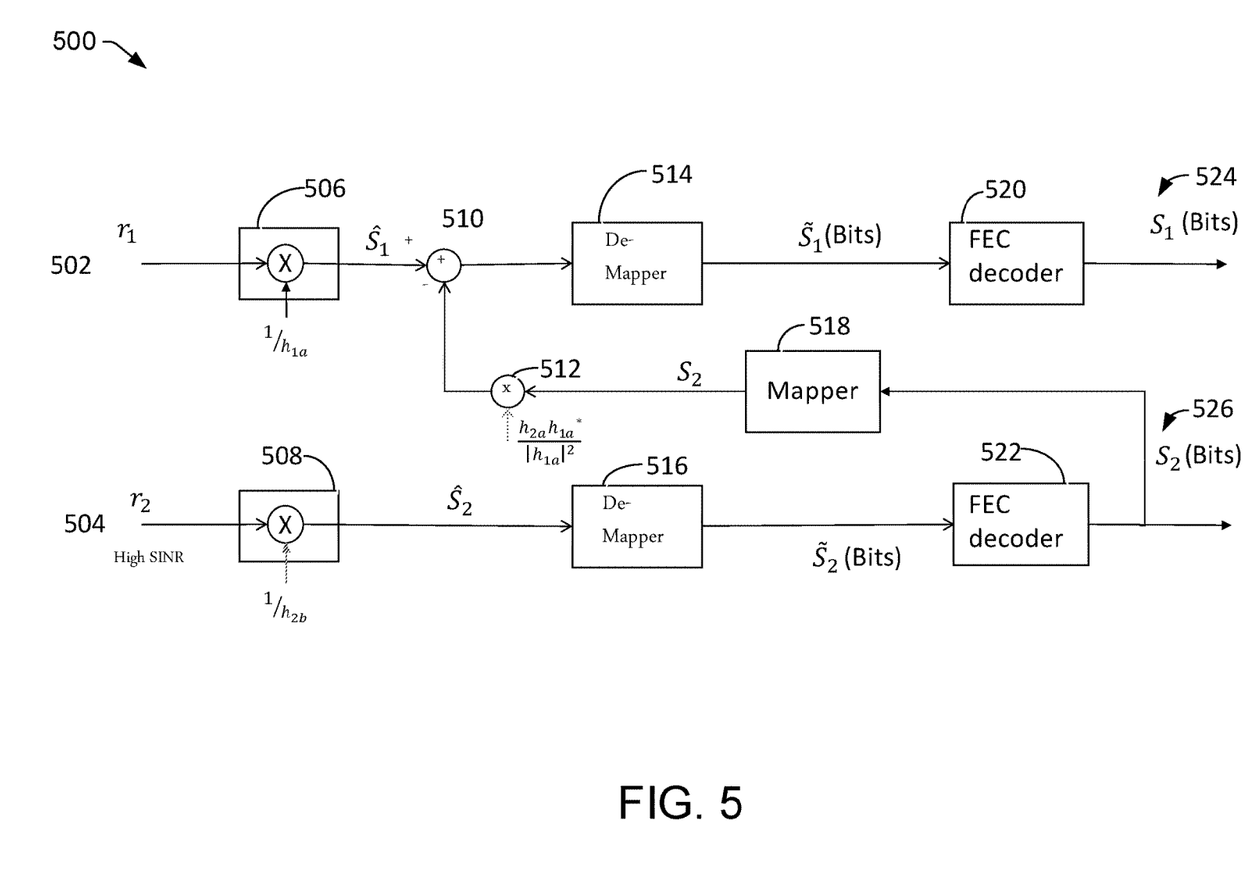
FIG. 5 is a block diagram of another process for detecting principle signals with assistance of decision feedback in a wireless communication network.

FIG. 5 is a block diagram of another process 500 for decision feedback assisting detection implementation in a wireless communication network. Process 500 is similar to process 400 with the addition of forward error correction (FEC) decoders in the feedback loop to remove any residual error in the detected symbol which may be used to remove corresponding interference items on other received signals, as described below.

In a particular example implementation using process 500 illustrated in FIG. 5, input 502 is a first received signal $r_1$ transported over link (e.g., fronthaul) 310 from cellular tower a. This signal may be written as $r_1 = h_{1a} \cdot S_1 + h_{2a} \cdot S_2 + n_1$, introduced above as Equation 1. Input 504 is a second received signal $r_2$ transported over link (e.g., fronthaul) 312 from cellular tower b. This signal may be written as $r_2 = h_{1b} \cdot S_1 + h_{2b} \cdot S_2 + n_2$, introduced above as Equation 2. As explained above, in the first received signal $r_1$, $h_{1a} \cdot S_1$ is the principle signal from wireless device 1 and $h_{2a} \cdot S_2$ is the interfering signal from wireless device 2. In the second received signal $r_2$, $h_{2b} \cdot S_2$ is the principle signal from wireless device 2 and $h_{1b} \cdot S_1$ is the interfering signal from wireless device 1.

Server 308 (or other processor) may determine the signal interference noise ratio (SINR) for each of $r_1$ and $r_2$. For example, SINR for $r_1$ may be based, at least in part, on $h_{1a}$ and $h_{2a}$ and SINR for $r_2$ may be based, at least in part, on $h_{1b}$ and $h_{2b}$. In the particular example, $r_2$ at input 504 has a larger SINR than that of $r_1$. This means that the principle signal $h_{2b} \cdot S_2$ from wireless device 2 is stronger relative to the interference signal $h_{1b} \cdot S_1$ as compared to the principle signal $h_{1a} \cdot S_1$ from wireless device 1 relative to the interference signal $h_{2a} \cdot S_2$. Thus, the detected symbol, $\tilde{S}_2$, of the second received signal is a better choice for use as feedback to offset the interference signal of the first received signal as compared to using detected symbol, $\tilde{S}_1$, of the first channel component as feedback to offset the interference signal of the second channel component The second received signal $r_2$ may first be normalized with channel gain $h_{2b}$ in function block 508 so that the normalized received signal has the same scale as the signal $S_2$ transmitted by device 2. Thus the normalized $r_2$ in Equation 8 is the estimate $\hat{S}_2$ of $S_2$. Then the estimate $\hat{S}_2$ of $S_2$ is fed to de-mapper 516 which first identifies the closest modulation constellation symbol in terms of distance to $\hat{S}_2$. As a result, the identified modulation constellation symbol is considered to be the detected symbol $\tilde{S}_2$ of $S_2$. With the adequate SINR, $\tilde{S}_2 = S_2$ with a high probability. Then the de-mapper converts detected modulation symbol into corresponding bits based on pre-set mapping rules. Next the detected bit sequence is fed to an FEC decoder 522, which may correct transmission errors due, in part, to the interference signal $h_{1b} \cdot S_1$ to obtain $S_2$ (which may at least be a more accurate version of $\hat{S}_2$). FEC decoder 522 also detects errors in the detected bit sequence if it cannot correct errors due to limited redundancy in the original code sequence, for example. If FEC decoder 522 indicates a failure, then the whole code word is ignored and no feedback is needed. Otherwise, the code word bit sequence is fed to mapper 518 which maps a group of bits (e.g., 2-bits, 4-bits, 6-bits, 8-bits) into a modulation constellation symbol to reconstruct or restore modulation symbol $S_2$ transmitted by device 2. In this way, the output of the mapper is the exact symbol transmitted by device 2. Basically, the QAM is a typical modulation in which 2-bits is for 4-QAM, 4-bits for 16-QAM, 6-bits is for 64-QAM, 8-bits is for 256-QAM, and so on. Next, the output symbol, $S_2$, is scaled in function block 512 with the coefficient of $$\frac{h_{2a} h_{1a}^*}{|h_{1a}|^2}$$

before it is fed to $\hat{S}_1$ at 510 for completely removing the interfering item ($2^{nd}$ item) in Equation 9. This operation results in the estimate, $\hat{S}_1$, as in Equation 11. Therefore, there may be no error propagation issue in this particular implementation. Then the estimate $\hat{S}_1$ of $S_1$ is fed to de-mapper 514 which first identifies the closest modulation constellation symbol in terms of distance to $\hat{S}_1$. As a result, the identified modulation constellation symbol is considered to be the detected symbol $\tilde{S}_1$ of $S_1$. With less interference or adequate SINR, $\tilde{S}_1 = S_1$ with a high probability. Then the de-mapper converts the detected modulation symbol into corresponding bits based on pre-set mapping rules. Next the detected bit sequence is fed to an FEC Decoder 520 for decoding information bits to complete the data transmission process from device 1 to wireless network 100.

Figure 6:
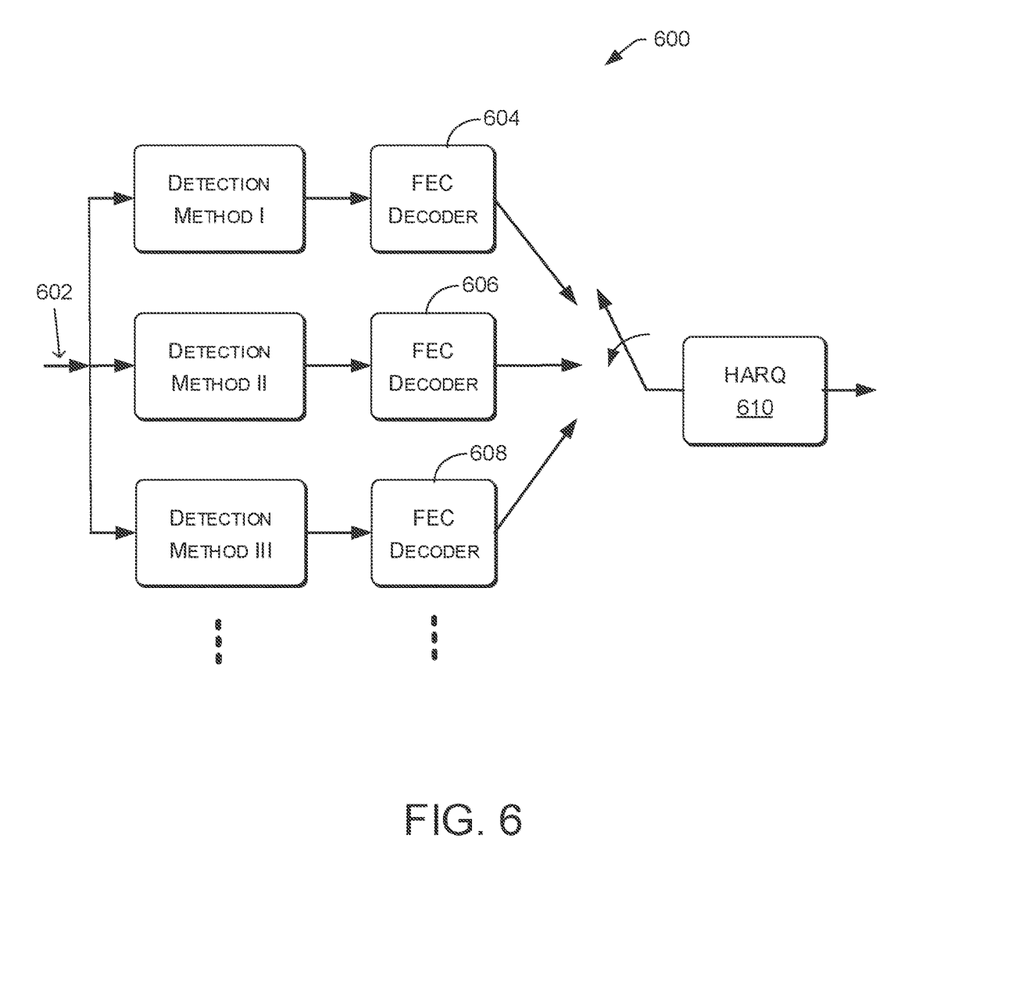
FIG. 6 is a block diagram of a process for parallelly employing multiple detection methods for detecting signals transmitted by wireless devices based on signals received from geo-spatially distributed cellular/cell towers.

Cloud or C-RAN architectures enable virtually infinite computing power and visibility of almost every cellular tower receivers to detect signals transmitted by wireless devices. FIG. 6 is a block diagram of a process 600 for parallelly employing multiple detection methods for detecting signals transmitted by wireless devices. Such detection is based, at least in part, on received signals from geo-spatially distributed cellular towers to achieve the best transmission performance in terms of bit error rate (BER), block error rate (BLER), or frame error rate (FER). A motivation is to make use of a diversity of various detection methods to achieve the optimal transmission performance mentioned above. Such motivation results from the fact that each detection method may have its own strengths and weaknesses and detection methods may be mutually complementary. It is also possible that one detection method may use the middle or final outputs of other detection methods to achieve the better transmission performance. The combination of two or more detection methods may also be able to achieve better transmission performance.

In general, process 600 may consider any of a number of detection methods (three are illustrated, but any number is possible) for detecting signals transmitted by devices based on the received signals introduced at input 602. For example, detection method I may involve a process that includes simultaneously solving two or more linear equations, as described above. In another example, detection method II may involve a process similar to or the same as process 400, described above. In yet another example, detection method III may involve a process similar to or the same as process 500, described above. FEC decoders 604, 606, and 608, that are respectively in-line with detection method I, detection method II, and detection method III may be used to achieve the best data transmission performance such as BER, BLER, or FER.

In a particular example implementation using process 600 illustrated in FIG. 6, input 602 may include a first received signal $r_1$ transported over link (e.g., fronthaul) 310 from cellular tower a. This signal may be written as $r_1 = h_{1a} \cdot S_1 + h_{2a} \cdot S_2 + n_1$, introduced above as Equation 1. A second received signal $r_2$ transported over link (e.g., fronthaul) 312 from cellular tower b may be written as $r_2 = h_{1b} \cdot S_1 + h_{2b} \cdot S_2 + n_2$, introduced above as equation 2. The input 602 may be a source such as a memory or a buffer that hosts all received signals received by geo-spatially distributed cellular towers or radio remote headers (RRHs), for example.

In this example of process 600, detection method I may access input 602 to get a first received signal $r_1$ and a second received signal $r_2$. Then detection method I may involve a process that includes simultaneously solving two or more linear equations, as described above. Then process 600 may perform the rest of detection method functions to feed the detected bit sequence to FEC decoder 604 for decoding. For this example, the FEC decoder may include two FEC decoders: one is for device 1 and one is for device 2, for example.

Similarly, detection method II may access input 602 to get a first received signal $r_1$ and a second received signal $r_2$. Then detection method II may involve a process similar to or the same as process 400, described above. Then process 600 may perform the rest of detection method functions to feed the detected bit sequence to FEC decoder 606 for decoding. For this example, the FEC decoder may include two FEC decoders: one is for device 1 and one is for device 2.

Similarly, detection method III may access input 602 to get a first received signal $r_1$ and a second received signal $r_2$. Then detection method III may involve a process similar to or the same as process 500, described above. Then process 600 may perform the rest of detection method functions to feed the detected bit sequence to FEC decoder 608 for decoding. For this example, the FEC decoder may include two FEC decoders: one is for device 1 and one is for device 2.

In this particular example implementation using process 600, detection method selecting module 220 of server 200, in conjunction with detection module 218, may perform all or a portion of detection methods I, II, and III and determine which output of the detection methods (e.g., FEC decoder's output) to be sent to an upper layer network or to request a re-transmit of the same block code by the transmitter in devices, A hybrid automatic repeat request (HARQ) 610 determines if a request for retransmitting a block of bits, namely a code block, based on an FEC decoder error indication should be sent to the transmitting end of devices (e.g., device 1). For example, if FEC decoder 604 and FEC decoder 608 indicate failures in decoding their codes while EFC decoder 606 indicates no error in decoding its code, then the output code bit sequence of FEC decoder 606 is forwarded to an upper network layer for further processing and the data transmission may be successfully completed. If all three FEC decoders indicate failures in decoding their codes, then no output is selected and the transmission of a block of bits or code word is considered as being a failure. As a result, a re-transmission request is sent back to the transmitting end in device for retransmitting the same block of bits by the HARQ function in the transmitter. As long as at least one of FEC decoders successfully decode its code, the transmission from device to network is considered to be successful with no need for a re-transmit request.

Figure 7:
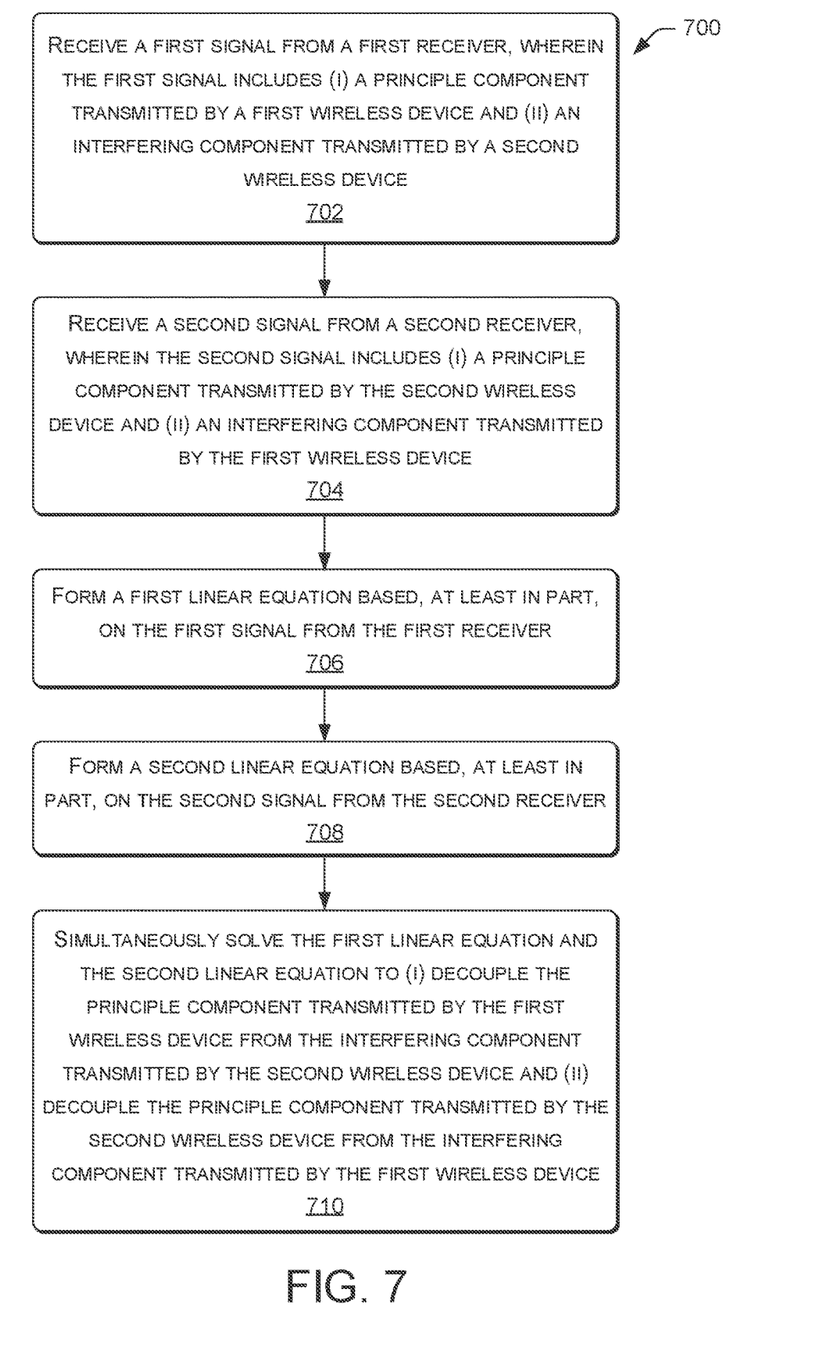
FIG. 7 is a flow diagram of process for de-coupling interference signals from principle signals in a wireless communication network, according to various embodiments.

FIG. 7 is a flow diagram of process 700 for decoupling principle signals from interference signals in a wireless communication network, according to various embodiments. For example, process 700 may be performed by server 308, illustrated in FIG. 3, or more specifically, in other examples, may be performed by a combination of applications module 216 and detection module 218, illustrated in FIG. 2.

At block 702, the server may receive, from a first receiver, a first signal that includes a principle component generated by a first wireless device and an interfering component generated by a second wireless device. At block 704, the server may receive, from a second receiver, a second signal that includes a principle component generated by the second wireless device and an interfering component generated by the first wireless device. In some examples, the first receiver and the second receiver are configured to operate based on multi-user and multiple-input and multiple-output (MIMO) processes. In various implementations, the first signal from the first receiver and the second signal from the second receiver are received by a base-band unit (BBU). The frequency at which the first receiver receives the first signal may be a frequency that overlaps or is adjacent to the frequency at which the second receiver receives the second signal. Such receivers may be cellular towers, for example, and the first wireless device and the second wireless device each may have a line of sight to both the first receiver and the second receiver.

At block 706, the server may form a first linear equation based, at least in part, on the first signal from the first receiver. At block 708, the server may form a second linear equation based, at least in part, on the second signal from the second receiver. At block 710, the server may simultaneously solve the first linear equation and the second linear equation. Such solving may lead to decoupling the principle component generated by the first wireless device from the interfering component generated by the second wireless device. Such solving may similarly lead to decoupling the principle component generated by the second wireless device from the interfering component generated by the first wireless device.

In some embodiments, the server may receive a third signal from a third receiver. The third signal may include a second principle component generated by the first wireless device and a second interfering component generated by the second wireless device. In yet other embodiments, the server may receive a third interfering component included in the first and/or second signal and generated by a third wireless device. In either case, the server may compare a magnitude of the third signal or the third interfering component to a predetermined threshold. If the magnitude of the third signal or the third interfering component is greater than the predetermined threshold, the server may form a third linear equation based, at least in part, on the third signal or the third interfering component. The server may subsequently simultaneously solve the first linear equation, the second linear equation, and the third linear equation to (i) decouple the principle components from the interfering components generated by the multiple wireless devices. On the other hand, if the magnitude of the third signal or the third interfering component is less than the predetermined threshold, then the server may ignore such a relatively weak signal and proceed to simultaneously solve the first linear equation and the second linear equation without considering the third signal.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving a first signal from a first receiver, wherein the first signal includes (i) a first principle component generated by a first wireless device and (ii) a first interfering component generated by a second wireless device;
   receiving a second signal from a second receiver, wherein the second signal includes (i) a second principle component generated by the second wireless device and (ii) a second interfering component generated by the first wireless device;
   forming a first linear equation based, at least in part, on the first signal from the first receiver;
   forming a second linear equation based, at least in part, on the second signal from the second receiver; and
   simultaneously solving the first linear equation and the second linear equation to (i) decouple the first principle component generated by the first wireless device from the first interfering component generated by the second wireless device and (ii) decouple the second principle component generated by the second wireless device from the second interfering component generated by the first wireless device.

2. The computer-implemented method of claim 1, wherein a first frequency at which the first receiver receives the first signal overlaps with a second frequency at which the second receiver receives the second signal.

3. The computer-implemented method of claim 1, wherein the first receiver and the second receiver are cellular towers.

4. The computer-implemented method of claim 3, wherein the first wireless device and the second wireless device each have a line of sight to both the first receiver and the second receiver.

5. The computer-implemented method of claim 1, further comprising:
   receiving a third signal from a third receiver, wherein the third signal includes (i) a third principle component generated by the first wireless device and (ii) a third interfering component generated by the second wireless device;
   comparing a magnitude of the third signal to a predetermined threshold;
   if the magnitude of the third signal is greater than the predetermined threshold:
      forming a third linear equation based, at least in part, on the third signal from the third receiver; and
      simultaneously solving the first linear equation, the second linear equation, and the third linear equation to (i) decouple the first principle component generated by the first wireless device from the first interfering component generated by the second wireless device, (ii) decouple the second principle component generated by the second wireless device from the second interfering component generated by the first wireless device, and iii) decouple the third principle component generated by the first wireless device from the third interfering component generated by the second wireless device; and if the magnitude of the third signal is less than the predetermined threshold:
simultaneously solving the first linear equation and the second linear equation without considering the third signal.

6. The computer-implemented method of claim 1, wherein the first receiver and the second receiver are configured to operate based on multi-user multiple-input and multiple-output (MIMO) processes.

7. The computer-implemented method of claim 1, wherein the first signal from the first receiver and the second signal from the second receiver are received by a base-band unit (BBU).

8. An apparatus comprising:
a non-transitory storage medium; and
instructions stored in the non-transitory storage medium, the instructions being executable by the apparatus to:
receive first signal data from a first receiver, wherein the first signal data includes (i) a first principle component generated by a first wireless device and (ii) a second interfering component generated by a second wireless device;
receive second signal data from a second receiver, wherein the second signal includes (i) a second principle component generated by the second wireless device and (ii) a second interfering component generated by the first wireless device;
form a first linear equation based, at least in part, on the first signal data from the first receiver;
form a second linear equation based, at least in part, on the second signal data from the second receiver; and
simultaneously solve the first linear equation and the second linear equation to (i) decouple the first principle component generated by the first wireless device from the first interfering component generated by the second wireless device and (ii) decouple the second principle component generated by the second wireless device from the second interfering component generated by the first wireless device.

9. The apparatus of claim 8, wherein a first frequency at which the first receiver receives a first signal on which the first signal data is based overlaps with a second frequency at which the second receiver receives a second signal on which the second signal data is based.

10. The apparatus of claim 8, wherein the first receiver and the second receiver are cellular towers.

11. The apparatus of claim 10, wherein the first wireless device and the second wireless device each have a line of sight to both the first receiver and the second receiver.

12. The apparatus of claim 8, wherein the instructions are further executable by the apparatus to:
receive a third signal from a third receiver, wherein the third signal includes (i) a third principle component generated by the first wireless device and (ii) a third interfering component generated by the second wireless device;

compare a magnitude of the third signal to a predetermined threshold;
if the magnitude of the third signal is greater than the predetermined threshold:
form a third linear equation based, at least in part, on the third signal from the third receiver; and
simultaneously solve the first linear equation, the second linear equation, and the third linear equation to (i) decouple the first principle component generated by the first wireless device from the first interfering component generated by the second wireless device, (ii) decouple the second principle component generated by the second wireless device from the second interfering component generated by the first wireless device, and iii) decouple the third principle component generated by the first wireless device from the third interfering component generated by the second wireless device; and
if the magnitude of the third signal is less than the predetermined threshold:
simultaneously solve the first linear equation and the second linear equation without considering the third signal.

13. The apparatus of claim 8, wherein the first receiver and the second receiver are configured to operate based on multi-user multiple-input and multiple-output (MIMO) processes.

14. A wireless communication network comprising:
one or more processors;
a non-transitory storage medium; and
instructions stored in the non-transitory storage medium, the instructions being executable by the one or more processors to:
receive first signal data from a first receiver, wherein the first signal data includes (i) a first principle component generated by a first wireless device and (ii) a first interfering component generated by a second wireless device;
receive second signal data from a second receiver, wherein the second signal includes (i) a second principle component generated by the second wireless device and (ii) a second interfering component generated by the first wireless device;
form a first linear equation based, at least in part, on the first signal data from the first receiver;
form a second linear equation based, at least in part, on the second signal data from the second receiver; and
simultaneously solve the first linear equation and the second linear equation to (i) decouple the first principle component generated by the first wireless device from the first interfering component generated by the second wireless device and (ii) decouple the second principle component generated by the second wireless device from the second interfering component generated by the first wireless device.

15. The wireless communication network of claim 14, wherein a first frequency at which the first receiver receives a first signal on which the first signal data is based overlaps with a second frequency at which the second receiver receives a second signal on which the second signal data is based.

16. The wireless communication network of claim 14, wherein the first receiver and the second receiver are cellular towers.

17. The wireless communication network of claim 16, wherein the first wireless device and the second wireless device each have a line of sight to both the first receiver and the second receiver.

18. The wireless communication network of claim 14, wherein the instructions are further executable by the one or more processors to:
- receive a third signal from a third receiver, wherein the third signal includes (i) a third principle component generated by the first wireless device and (ii) a third interfering component generated by the second wireless device;
- form a third linear equation based, at least in part, on the third signal from the third receiver; and
- simultaneously solve the first linear equation, the second linear equation, and the third linear equation to (i) decouple the first principle component generated by the first wireless device from the first interfering component generated by the second wireless device, (ii) decouple the second principle component generated by the second wireless device from the second interfering component generated by the first wireless device, and iii) decouple the third principle component generated by the first wireless device from the third interfering component generated by the second wireless device.

19. The wireless communication network of claim 14, wherein the first receiver and the second receiver are configured to operate based on multi-user multiple-input and multiple-output (MIMO) processes.

20. The wireless communication network of claim 14, wherein the first signal data from the first receiver and the second signal data from the second receiver are received by a base-band unit (BBU).

* * * * *